No. 617,895. Patented Jan. 17, 1899.
L. K. BELL.
INSTRUMENT FOR MEASURING SMALL VISUAL ANGLES.
(Application filed Dec. 13, 1897.)
(No Model.) 4 Sheets—Sheet 1.
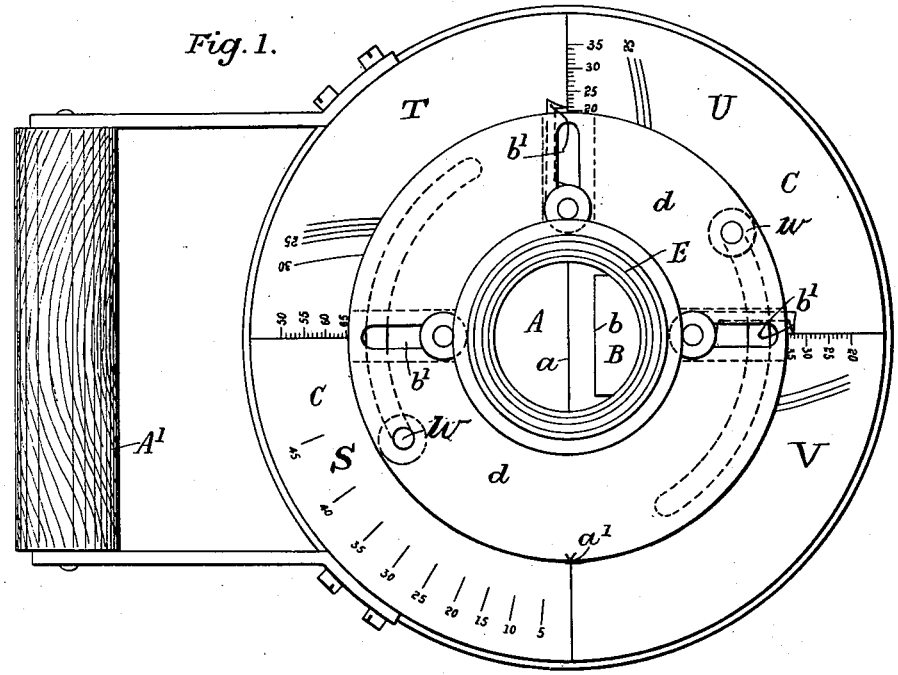
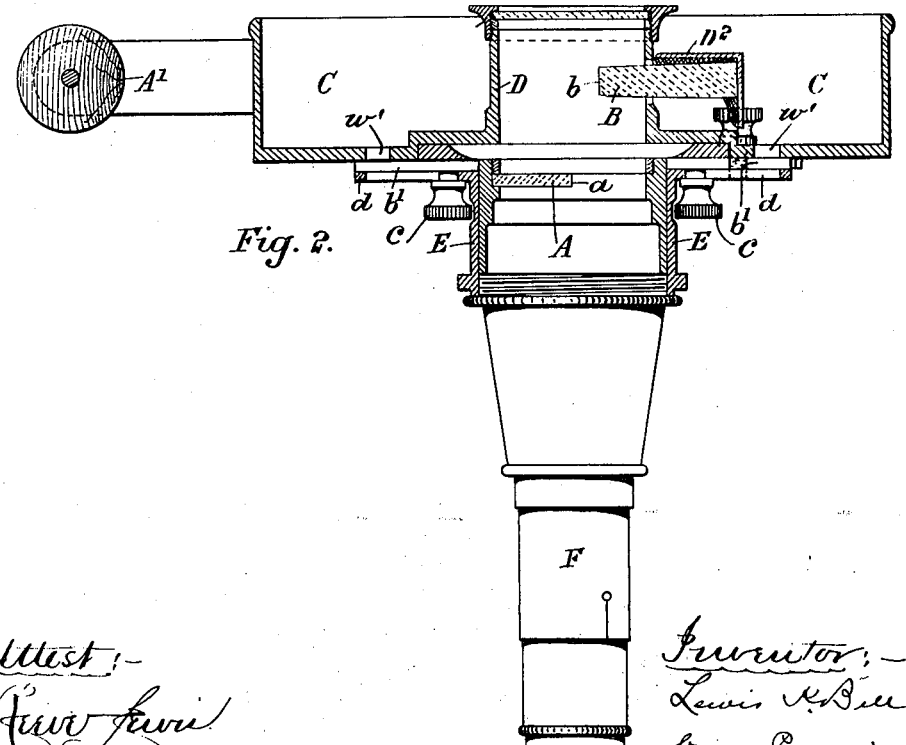

No. 617,895. Patented Jan. 17, 1899.
L. K. BELL.
INSTRUMENT FOR MEASURING SMALL VISUAL ANGLES.
(Application filed Dec. 13, 1897.)
(No Model.) 4 Sheets—Sheet 2.
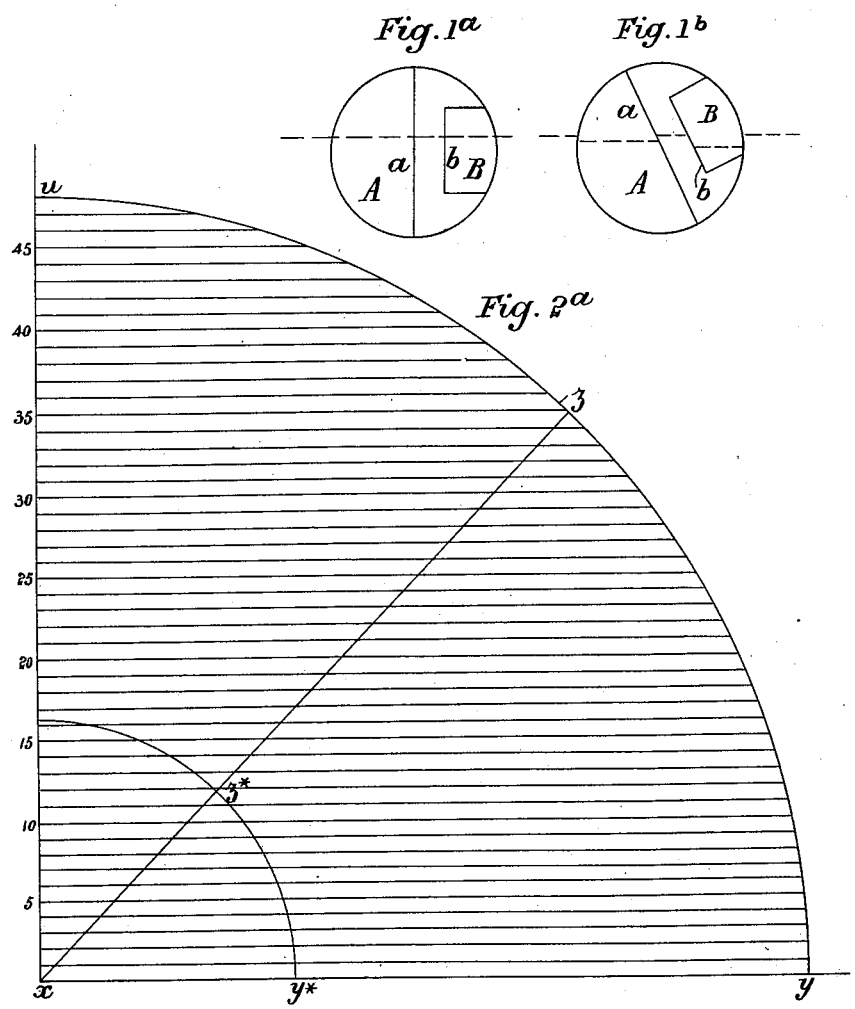
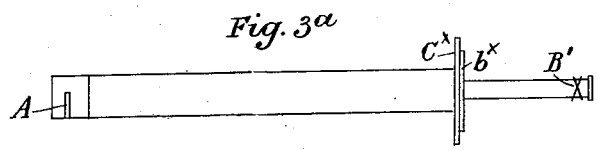
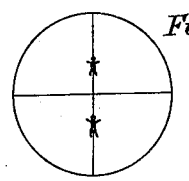 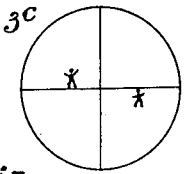

No. 617,895. Patented Jan. 17, 1899.
L. K. BELL.
INSTRUMENT FOR MEASURING SMALL VISUAL ANGLES.
(Application filed Dec. 13, 1897.)
(No Model.) 4 Sheets—Sheet 3.
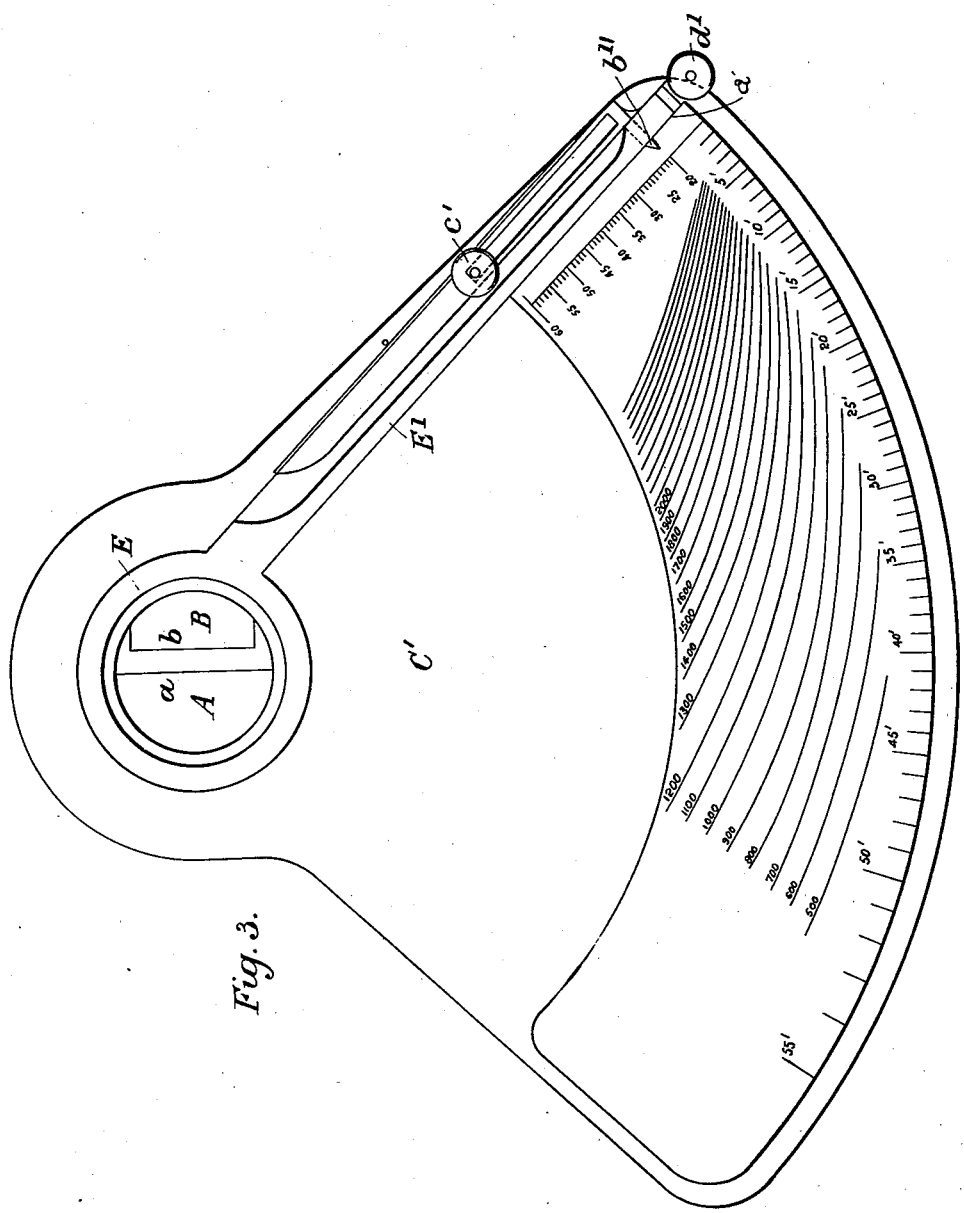

No. 617,895. Patented Jan. 17, 1899.
L. K. BELL.
INSTRUMENT FOR MEASURING SMALL VISUAL ANGLES.
(Application filed Dec. 13, 1897.)
(No Model.) 4 Sheets—Sheet 4.
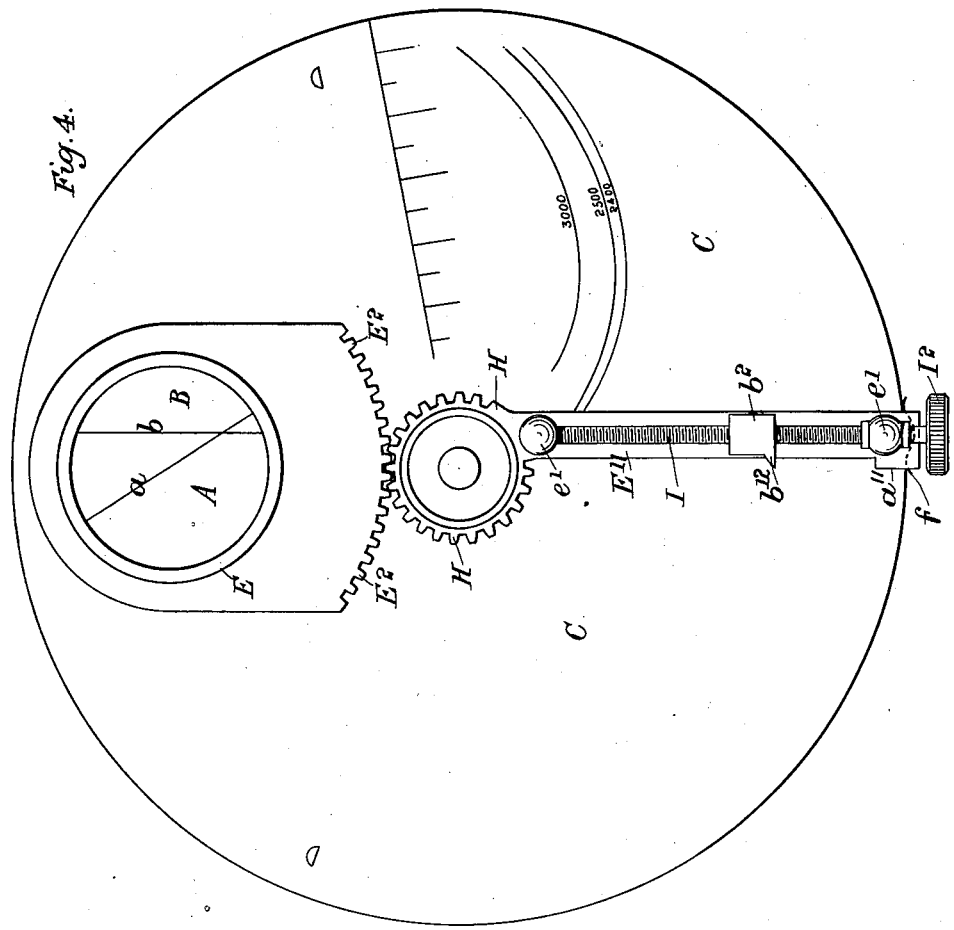
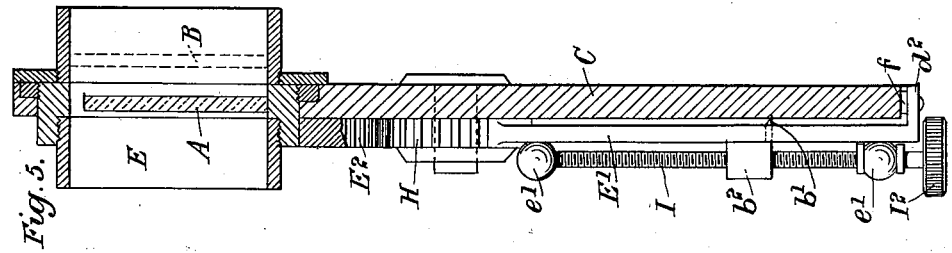

UNITED STATES PATENT OFFICE.

LEWIS K. BELL, OF THE BRITISH ROYAL NAVY.

INSTRUMENT FOR MEASURING SMALL VISUAL ANGLES.

SPECIFICATION forming part of Letters Patent No. 617,895, dated January 17, 1899.

Application filed December 13, 1897. Serial No. 661,600. (No model.)

*To all whom it may concern:*

Be it known that I, LEWIS KNOX BELL, a subject of the Queen Great Britain and Ireland, a commander in the Royal Navy, at present on the Mediterranean Station, have invented a new and Improved Instrument for Measuring Small Visual Angles and for the Determination of Distances Thereby, (for which I have obtained a patent in Great Britain, No. 7,972, dated April 15, 1896,) of which the following is a specification.

My invention has for its principal object to provide a simple and efficient instrument for the measurement of small visual angles in such a manner as to insure an exaggerated reading on an arc or scale, and is primarily intended for determining the distance of objects at sea or on land by observing from a known height the angle subtended by the horizon and the water-line of an object at sea, or the angle of elevation of or the angle subtended by an object of known height or dimensions, or by observing the depression-angle, or any other well-known method of determining distance by the measurement of visual angles, a graduated arc or scale being provided to enable the distance corresponding to the angle observed to be read off directly, as well as the angle measured. For this purpose I employ a prism of known angle of minimum deviation so mounted that it can be rotated in the plane which bisects its refracting-angle perpendicular to the line of sight through an angle of ninety degrees.
If a point or object on the horizon be now viewed, the prism-holder may be so held that the refracted image in the prism will appear horizontally apart from the directly-viewed image and at an angular distance from it equal to the angle of minimum deviation of the prism. If the prism be then rotated in the same plane by turning the holder thereof through an angle of ninety degrees, the refracted image will move on the circumference of a circle described about the point or object until it appears vertically above or below the directly-viewed image, and the portion of the horizon seen on either side of the point or object will undergo displacement in a similar manner. When the refraction takes place only in a horizontal direction—that is, when the axis of the prism is vertical—the horizon as seen through the prism and by direct vision will appear in an unbroken line, and when the holder of the prism is rotated through an angle of ninety degrees the directly-viewed and refracted images of the horizon will be separated vertically to an angular distance equal to the angle of minimum deviation of the prism. If the rotatory movement of the prism be arrested at any point between these positions of only horizontal and only vertical displacement, the vertical angle subtended by the directly-viewed and refracted images will be equal to the angle of deviation of the prism multiplied by the line of the angle rotated. For instance, if the minimum angle of deviation of the prism be sixty minutes then if the holder of the prism be rotated in the manner described through an angle of thirty degrees from the position of only horizontal displacement the vertical angle subtended by the directly-viewed and refracted images of the horizon will be sixty minutes multiplied by thirty degrees—that is, thirty minutes. This rotatable prism is hereinafter referred to as prism A. Also, if a prism be fixedly attached to a support or frame the latter may be so placed or held in the hand that the directly-viewed and refracted images of the horizon are seen in an unbroken line—that is, when it is so held that refraction in the prism only takes place in a horizontal direction, and if this position be lost it may be recovered by moving the support in the same plane—*i. e.*, the plane of the prism's axis perpendicular to the line of sight—until continuity of the horizon is regained. This fixed prism is hereinafter referred to as prism B.

For use at sea in measuring small visual angles for the determination of distance the instrument may consist of two principal parts capable of being rotated on the same axis one about the other through an angle of ninety degrees. One part forms the support or frame of the instrument and may be a disk of metal or other suitable material having an axial hole or aperture in or about which a tube can be rotated. The other part consists of the said tube having attached to it circumferentially a disk of a diameter smaller than that of the support or frame with which it is in contact, the ring of the latter surrounding its circumference being used for graduating the instrument, and the common axis of tube and support is the line of collimation of the instrument.

In the tube I fix the prism A, whose minimum angle of deviation is approximately equal to and not less than the largest angle which the instrument is required to measure. This prism may be of semicircular form and is fixed in the position of minimum deviation in a plane perpendicular to the axis of the tube, the base of the prism being preferably toward the axis of the tube.

In the hole or aperture in the support I fix the prism B, which is of fairly large refracting-angle (about three or four degrees,) also in a plane perpendicular to the axis of the tube, this prism being preferably arranged with its summit toward the axis of the tube and so that when the horizon is viewed through the tube a portion of it will be seen by direct vision between the edges of the two prisms, and also on the one hand through the prism B and on the other hand through the prism A. The support can thus be held in such position that the horizon as seen by direct vision and through the prism B is an unbroken line, and maintaining this position of the support the tube can be rotated until the horizon as seen in the prism A is continuous in the same line. Both prisms are then refracting only in a truly horizontal direction, and this is the observing position of the support and the zero position of the tube, which can be indicated by an indicating-point, as $a'$, Fig. 1, on the disk attached to it coinciding with the initial point of graduation on that part or ring of the support surrounding it. If the support be maintained in this position, the tube can be rotated until the horizon as seen directly and through the prism B touches the water-line, viewed through the prism A, of an object at sea whose distance it is desired to determine, and by the angle of rotation of the tube from the zero position, as described, the vertical angle subtended between the direct and refracted horizons is obtained, and consequently the angle between the horizon and the water-line of the object from which angle the distance can be determined, the height of the eye of the observer above the sea being known. In a similar manner angles of elevation above the horizon—such as the altitude of distant land, ships' mastheads, and the like—can be measured.

A scale may be made on, say, each of the four quadrants of the support, placing four indices $a'$ $b'$ $b'$ $b'$, the several indices $b'$ being radially adjustable by means of the set-screws $c$, to which they are attached and which are movable in the radial slots $s$ in the disk $d$ on the movable circle, so that the instrument may be graduated on one quadrant to read direct the vertical angle measured, on another quadrant the distance of an object due to the angle measured at certain heights, on another quadrant the distance at certain other heights, and so on, or the graduations may be so made as to give the distance for all practical heights either of the observer's eye or of the object whose elevation is observed.

A telescope may be attached to the tube, and the prism A may be placed in the manner described either before or behind the object-glass, or it may be attached to the said glass.

Figure 1 of the accompanying drawings represents in elevation and Fig. 2 in horizontal section an instrument constituted according to this invention. Figs. 1$^a$ and 1$^b$ are diagrams showing different positions of the prisms. Fig. 2$^a$ is a diagram illustrating the manner of constructing the scale. Fig. 3 is a front elevation of a modified form of instrument. Figs. 4 and F represent in front elevation and vertical section, respectively, another modification in the form of the instrument and means for rotating the prism; and Figs. 3$^a$, 3$^b$, and 3$^c$ are diagrammatic view illustrating a modification.

Referring to Figs. 1 and 2, C is the body or holder of the instrument, of circular form, provided with a handle $A'$ and carrying on one side a tube D, having an opening in its side through which projects to within a short distance of the axial line of the tube a prism B, the said prism being fixed in a case $D^2$, connected by screws to the body or holder C. On the side of the body or holder C opposite that which carries the tube D is fitted so as to be capable of rotation a tube E, carrying another prism A, having a less angle than the prism B. The axes of the tubes D and E are in line one with the other, and the tube E is shown as being connected to the body or holder C by screws $w$, passing through a flange $d$ on the tube and through slots $w'$ in the body or holder concentric to the axes of the tubes E and D.

The prisms A and B when in their normal position have their edges $a$ $b$ parallel one to the other, as shown in diagram Fig. 1$^a$, so that on looking through the tube E at the horizon, for example, with the edges $a$ $b$ of the prisms perpendicular to the horizon, the said horizon will appear as a continuous line, refraction taking place to the right or left; but if the holder C be turned to the right or to the left the horizon will appear to be twice broken, as shown, for instance, in the diagram Fig. 1$^b$, the prism B of larger angle throwing the portion of the horizon seen therethrough considerably farther out of the line than does the prism A of smaller angle. Now if the instrument be held so that the horizon appears as shown in diagram Fig. 1$^a$ and then the tube E, carrying the prism A, be turned axially a portion of the horizon will be refracted in the prism A and subtend an angle, with the horizon seen through the prism B and directly through the space between the edges $a$ and $b$ of the prisms. On the base or flange $d$ of the tube E is a pointer or index-mark $a'$ to indicate on the scale marked on the holder C the angle through which the tube E and prism A are turned. Each quadrant of the circular body or holder C (the circle being struck from the axis of the tube E) may be graduated—viz., one quadrant S for angles, one, T, for distances according to the height in feet of the observer's eye when observing from the bridge of the vessel, one, U, when observing from the conning-tower, and the other, V, for observing from some other height, so that the same instrument can be used for ascertaining distances at whatever height the observer may be.

The following is a simple method of constructing the scales: Let $x$, Fig. 2$^a$, represent the axis of the tube E, which carries the prism A; $x\,y$, radius of arc $y\,z\,u$ to be graduated. Erect a perpendicular $x\,u$ on $x$ and divide the line $x\,u$ into the same number of equal parts as the angle of minimum deviation of the prism A contains minutes—say, for example, forty-eight minutes. Through these divisions draw lines parallel to the line $x\,y$ to the arc $y\,z\,u$. Then when the tube E, carrying the prism A, is rotated the mark on the arc where the pointer on the flange of the tube reaches indicates on the arc the number of minutes measured by the prism A. For example, suppose the line $x\,u$ to be divided into forty-eight divisions, corresponding to the number of minutes in the angle of minimum deviation of the prism A, as before described, and the tube E be rotated from its zero position—that is, when the edges $a\,b$ of the prisms A B are parallel to each other—till the pointer $a'$ on the flange of the tube reaches the division "35" on the arc—for instance, at $z$—the angle measured will be thirty-five minutes. The graduations for the measurement of angles being found, as described, the other quadrants of the circle can be graduated for measuring distances. The divisions should be made in the first instance on a large scale and be reproduced on a scale suitable to the instrument. For instance, if it be required to graduate on an arc $y^*\,z^*\,u^*$ of, say, two inches radius a distance of one thousand yards, the height of the observer's eye being thirty-five feet the angle to be measured is 34.69 minutes. Set off on the vertical or radius line of the arc $x\,u$ 34.69 minutes, and draw a line parallel to $x\,y$ from this point through the large arc $y\,z\,u$, and from the point of intersection on this arc draw a line to $x$. Then the point where this line intersects the smaller arc $y^*\,z^*\,u^*$ indicates the point of measurement of one thousand yards on the said arc. Graduations for other distances are similarly ascertained and marked on the arc $y^*\,z^*\,u^*$. In like manner distances are indicated and marked on arcs of other radii for different heights of the observer's eye.

The angles are calculated from the formula $$a = \frac{1146 \times (h + C - R)}{d},$$

where $a$ = angle subtended between the horizon and water-line of the object + the dip due to height of observer's eye in minutes.
1,146 = one-third radian or unit angle (57°—17'—44"+) expressed in minutes.
$h$ = height of eye in feet.
$d$ = distance in yards.
$C - R$ = curvature — refraction.

The values of $C - R$ used are—

At 500 yards, 0.04 feet added to height of eye.
1,000 yards, 0.20 feet added to height of eye.
1,500 yards, 0.42 feet added to height of eye.
2,000 yards, 0.71 feet added to height of eye.
2,500 yards, 1.07 feet added to height of eye.
3,000 yards, 1.50 feet added to height of eye.

and proportionately at distances between the above.

The values of the dip used are—

| | |
|---|---|
| 20 feet, 4.30 minutes. | 45 feet, 6.45 minutes. |
| 25 feet, 4.87 minutes. | 50 feet, 6.77 minutes. |
| 30 feet, 5.25 minutes. | 55 feet, 7.10 minutes. |
| 35 feet, 5.65 minutes. | 60 feet, 7.44 minutes. |
| 40 feet, 6.07 minutes. | 65 feet, 7.65 minutes. |

The flange of the tube E is provided with radially-adjustable pointers $b'$, one for each of the three quadrants containing the scales for the different heights of the observer's eye. The instrument is provided with a telescope F, as shown in Fig. 2, screwed into the tube E.

In the apparatus illustrated by Fig. 3 only one quadrant is provided, the said quadrant containing scales or graduations for indicating angles and also for distances. To the tube E, carrying the prism A, is connected an arm or radius-bar E', by which the tube and prism can be turned axially in the body or holder C'. The scales may be marked on the body or holder C' itself; but it is preferred to mark the scales on a separate piece and attach it to the holder, so that it can be removed and replaced by another scale when desired. The outer edge of the quadrant is graduated for angles in minutes, and the radius of the quadrant is graduated for heights of the observer's eye—say from twenty to sixty feet. The radius-bar is fitted with an adjustable pointer $b''$, which can be slid along the radius-bar to the division on the radius-line of the quadrant corresponding to the height of the observer's eye and can be fixed in its adjusted position by a binding-nut $c'$.

The forward edge $a'$ of the radius-bar serves as a pointer to indicate on the graduations on the edge of the quadrant the angle in minutes measured.

The radius-bar can be fixed by means of the clamping-screw and nut $d'$ in the position to which it has been moved. For an instrument for general use at heights varying from twenty to sixty feet the angle of deviation of the prism A may be from about forty-eight to seventy minutes; but for an instrument intended for use at lower heights—say from twenty to thirty feet, which would meet the requirements of the barbette, turret-guns, and upper-deck batteries of battle-ships—an angle of about twenty-four minutes will be sufficient.

In the arrangement illustrated by Figs. 4 and 5 the tube or holder E of the prism A is arranged eccentrically to the center of the disk C and is provided with a toothed segment $E^2$, with which gears a wheel H, mounted on a stud in the center of the disk C. To the wheel H is attached a radius arm or bar $E''$, carrying in bearings $e'$ a screw-threaded spindle I, on which is fitted so as to traverse therealong a nut $b^2$, provided with an index-pointer $b^{12}$ to indicate on the scale the height of the observer's eye, the screw being rotated for the purpose of adjusting the index-pointer $b^{12}$ by means of a milled head $I^2$.

The radius-bar $E''$ is provided at its outer end with a depending lip $d^2$, between which lip and the periphery of the disk C is interposed a spring $f$ for the purpose of causing sufficient friction between the radius-bar and the disk C to retain the bar in the position to which it is adjusted. The front edge $a''$ of the radius-bar serves as the index to indicate on the scale the angle in minutes measured.

In constructing an instrument for use on land the movable prism B may be dispensed with and the prism A be fixed in front of the object-glass of a terrestrial telescope, the eye-piece of the telescope being provided inside with cross threads or wires $B'$, as shown diagrammatically in Figs. $3^a$, $3^b$, and $3^c$. The prism A is arranged so as to cover about one-half the field of view, and its zero position is such that its summit is parallel to one of the cross wires or threads and perpendicular to the other cross wire or thread. To the tube of the telescope is attached a disk C, having one quadrant thereof graduated to angles and another quadrant graduated for distances corresponding to, say, five and one-half feet in height, about the height of a man, and the eye-piece carries a disk or index, which works in close proximity to the disk C. Now if, for example, it be wished to obtain the angle subtended by a man standing at a distance the tube of the telescope is adjusted so that the prism measures the maximum vertical angle, and then the telescope is directed to the object (the man) and turned bodily until the direct image and the refracted image of the object are in a vertical line on or parallel to the vertical cross-wire, as shown in the diagram Fig. $3^b$, the upper figure being the direct view and the lower figure the refracted view of the object. Retaining the eyepiece of the telescope and the cross-wires in this position, turn the tube containing the prism until the top of the lower figure and the bottom of the top figure simultaneously touch the horizontal wire or thread, as shown in Fig. $3^c$. The rotation thus given to the prism measured from the zero-point on the scale indicates the angle and distance, as hereinbefore described. The scales for use with this instrument are similar to those shown in Figs. 1 and 3, the oblique lines being, as before, lines of distance, while the radial graduations indicate heights of objects observed. The angle $a$, subtended at the eye by an object at a distance, is given by the formula:

$$\text{Tan. } a = \frac{\text{height of object}}{\text{distance}},$$

and in constructing the scales a table of angles (in minutes) calculated by this formula is to be used, as before described. Before making an observation the adjustable pointer or index is set to the height (known or estimated) of the object whose distance is to be measured. The same principle can be applied to the construction of similar instruments on a binocular form.

Having now particularly described and ascertained the nature of my said invention and in what manner the same is to be performed, I declare that what I claim is—

1. In an instrument for measuring visual angles the combination with a prism of known angle of minimum deviation rotatable in a plane perpendicular to the line of sight and occupying but a portion of the field of vision, of a fixed refracting-prism occupying a different portion of the field of vision, by means of which the instrument can be adjusted to the correct position for making correct observations, substantially as described.

2. In an instrument for measuring visual angles and distances the combination with a prism of known angle of minimum deviation, rotatable in a plane perpendicular to the line of sight and occupying but a portion of the field of vision, of a fixed refracting-prism occupying a different portion of the field of vision, by means of which the instrument can be adjusted to the correct position for making correct observations, and by a scale or scales for indicating the angle and distance measured, substantially as described.

In testimony whereof I have signed my name to this specification in the presence of two subscribing witnesses.

LEWIS K. BELL.

Witnesses:
CHARLES EDMUND IOWELL,
RASARIO CALLEJO.